(12) United States Patent
Orth et al.

(10) Patent No.: US 10,296,874 B1
(45) Date of Patent: May 21, 2019

(54) SYSTEM AND METHOD FOR PREVENTING UNAUTHORIZED ACCESS TO FINANCIAL ACCOUNTS

(75) Inventors: Richard Orth, Mesa, AZ (US);
Priscilla M. Morgan, Peoria, AZ (US);
Rafael T. Perez, Glendale, AZ (US);
Lee J. Peart, Epsom (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 2142 days.

(21) Appl. No.: 12/343,178

(22) Filed: Dec. 23, 2008
(Under 37 CFR 1.47)

Related U.S. Application Data

(63) Continuation of application No. 12/108,064, filed on Apr. 23, 2008, now abandoned.
(Continued)

(51) Int. Cl.
*G06Q 40/00* (2012.01)
*G06Q 20/00* (2012.01)
(Continued)

(52) U.S. Cl.
CPC ............ *G06Q 20/00* (2013.01); *G06Q 20/04* (2013.01); *G06Q 20/20* (2013.01); *G06Q 20/409* (2013.01)

(58) Field of Classification Search
CPC ........ G06Q 30/00; G06Q 30/06; G06Q 20/04; G06Q 20/00; G06Q 20/20; G06Q 20/409
(Continued)

(56) References Cited

U.S. PATENT DOCUMENTS 6,075,895 A    6/2000  Qiao et al.
6,098,053 A *  8/2000  Slater .............................. 705/44
(Continued)

FOREIGN PATENT DOCUMENTS

CA    2460886 A1 *  4/2003  ............ G06Q 20/04
WO    2007033358     3/2007

OTHER PUBLICATIONS

Burton: "Playing It Safe", Fundraising Success; Philadelphia vol. 5, Iss. 8, Aug. 2007 (Year: 2007).*
(Continued)

*Primary Examiner* — Edward J Baird
(74) *Attorney, Agent, or Firm* — Snell & Wilmer, L.L.P.

(57) ABSTRACT

A method and a system are provided for preventing unauthorized access to financial accounts. A financial services system creates and stores a global external number corresponding to a funding account number that is associated with a financial account. A vendor system requests the corresponding global external number from the financial services system, which returns the corresponding global external number. The vendor system stores the global external number with customer identification information and/or transaction records. The vendor system requests payments for transactions by supplying the global external number stored in a transaction record to the financial services system. The financial services system authenticates the vendor system, and returns the corresponding funding account number. The vendor system generates a transaction settlement request using the funding account number. If the vendor system is compromised, no financial accounts can be accessed, since the vendor system does not store funding account numbers.

21 Claims, 3 Drawing Sheets

Related U.S. Application Data

(60) Provisional application No. 61/014,313, filed on Dec. 17, 2007.

(51) Int. Cl.
    *G06Q 20/20*     (2012.01)
    *G06Q 20/40*     (2012.01)
    *G06Q 20/04*     (2012.01)

(58) Field of Classification Search
    USPC .................................................. 705/35–45
    See application file for complete search history.

(56) References Cited

U.S. PATENT DOCUMENTS

| | | | |
|---|---|---|---|
| 6,327,578 B1* | 12/2001 | Linehan | G06Q 20/02 705/65 |
| 6,421,453 B1 | 7/2002 | Kanevsky et al. | |
| 6,509,707 B2 | 1/2003 | Yamashita et al. | |
| 6,533,168 B1 | 3/2003 | Ching | |
| 6,788,809 B1 | 9/2004 | Grzeszczuk et al. | |
| 6,999,943 B1* | 2/2006 | Johnson | G06Q 20/10 705/35 |
| 7,308,112 B2 | 12/2007 | Fujimura et al. | |
| 7,365,735 B2 | 4/2008 | Reinhardt et al. | |
| 7,365,737 B2 | 4/2008 | Marvit et al. | |
| 7,394,346 B2 | 7/2008 | Bodin | |
| 7,395,241 B1* | 7/2008 | Cook et al. | 705/39 |
| 7,595,816 B1 | 9/2009 | Enright et al. | |
| 7,650,314 B1* | 1/2010 | Saunders | G06Q 20/00 705/39 |
| 7,746,215 B1 | 6/2010 | Bishop | |
| 7,775,440 B2 | 8/2010 | Silverbrook et al. | |
| 7,894,634 B2 | 2/2011 | Chung | |
| 7,908,216 B1* | 3/2011 | Davis | G06Q 20/02 705/41 |
| 7,971,784 B2 | 7/2011 | Lapstun et al. | |
| 8,028,896 B2 | 10/2011 | Carter et al. | |
| 8,172,135 B1 | 5/2012 | Aidasani et al. | |
| 8,181,858 B2 | 5/2012 | Carter et al. | |
| 8,468,584 B1 | 6/2013 | Hansen | |
| 2003/0061167 A1* | 3/2003 | Mann, III | G06Q 20/04 705/64 |
| 2003/0126094 A1* | 7/2003 | Fisher | G06Q 20/02 705/75 |
| 2003/0132974 A1 | 7/2003 | Bodin | |
| 2004/0039694 A1* | 2/2004 | Dunn et al. | 705/39 |
| 2004/0078329 A1* | 4/2004 | Kight et al. | 705/40 |
| 2004/0093308 A1* | 5/2004 | Kawashima et al. | 705/44 |
| 2004/0111370 A1* | 6/2004 | Saylors | G06Q 20/10 705/40 |
| 2005/0033686 A1* | 2/2005 | Peart et al. | 705/39 |
| 2005/0044042 A1 | 2/2005 | Mendiola et al. | |
| 2005/0097320 A1 | 5/2005 | Golan et al. | |
| 2005/0171776 A1 | 8/2005 | Kojima et al. | |
| 2005/0210288 A1* | 9/2005 | Grosse | H04L 63/0272 726/5 |
| 2005/0211765 A1* | 9/2005 | Brown | G06Q 20/102 235/379 |
| 2006/0094399 A1 | 5/2006 | Dupont | |
| 2006/0144946 A1 | 7/2006 | Kuriyama et al. | |
| 2006/0200480 A1 | 9/2006 | Harris et al. | |
| 2006/0215821 A1 | 9/2006 | Rokusek et al. | |
| 2006/0255125 A1* | 11/2006 | Jennings, Jr. | G06Q 20/20 235/380 |
| 2007/0055630 A1 | 3/2007 | Gauthier et al. | |
| 2007/0075968 A1 | 4/2007 | Hall et al. | |
| 2007/0152035 A1 | 7/2007 | Adams et al. | |
| 2007/0252898 A1 | 11/2007 | Delean | |
| 2008/0000117 A1 | 1/2008 | Marshall et al. | |
| 2008/0086421 A1* | 4/2008 | Gilder et al. | 705/44 |
| 2008/0135612 A1* | 6/2008 | Silbernagl | G06Q 20/20 235/382 |
| 2008/0164308 A1* | 7/2008 | Aaron | G06Q 20/14 235/380 |
| 2008/0183622 A1* | 7/2008 | Dixon | G06Q 20/027 705/44 |
| 2008/0222048 A1 | 9/2008 | Higgins et al. | |
| 2008/0270301 A1* | 10/2008 | Jones | G06Q 20/02 705/41 |
| 2008/0288403 A1* | 11/2008 | von Mueller | 705/44 |
| 2009/0006646 A1 | 1/2009 | Duarte | |
| 2009/0108057 A1 | 4/2009 | Mu et al. | |
| 2009/0265671 A1 | 10/2009 | Sachs et al. | |
| 2010/0008535 A1 | 1/2010 | Abulafia et al. | |
| 2010/0088227 A1* | 4/2010 | Belamant | 705/41 |
| 2010/0111377 A1 | 5/2010 | Monroe | |
| 2010/0121725 A1 | 5/2010 | Adams et al. | |
| 2010/0131273 A1 | 5/2010 | Aley-Raz et al. | |
| 2010/0203870 A1 | 8/2010 | Hubinak et al. | |
| 2010/0216396 A1 | 8/2010 | Fernandez et al. | |
| 2011/0093821 A1 | 4/2011 | Wigdor et al. | |
| 2011/0098023 A1 | 4/2011 | Hammad | |
| 2011/0112920 A1 | 5/2011 | Mestre et al. | |
| 2011/0155800 A1 | 6/2011 | Mastrangelo et al. | |
| 2011/0161229 A1 | 6/2011 | Mastrangelo et al. | |
| 2011/0166997 A1 | 7/2011 | Dixon et al. | |
| 2011/0184821 A1 | 7/2011 | Mon et al. | |
| 2011/0184867 A1 | 7/2011 | Varadarajan | |
| 2011/0220718 A1 | 9/2011 | Dixon et al. | |
| 2011/0251892 A1 | 10/2011 | Laracey | |
| 2011/0251954 A1 | 10/2011 | Chin | |
| 2011/0263292 A1 | 10/2011 | Phillips | |
| 2011/0270757 A1 | 11/2011 | Hammad | |
| 2011/0282785 A1 | 11/2011 | Chin | |
| 2012/0030195 A1 | 2/2012 | Holt et al. | |
| 2012/0151380 A1 | 6/2012 | Bishop | |
| 2012/0158528 A1 | 6/2012 | Hsu et al. | |
| 2012/0166314 A1 | 6/2012 | Kimberg | |
| 2012/0173325 A1 | 7/2012 | Johri | |
| 2012/0200389 A1 | 8/2012 | Solomon | |
| 2012/0203666 A1 | 8/2012 | Torossian et al. | |
| 2012/0280040 A1 | 11/2012 | Carney et al. | |
| 2012/0307109 A1 | 12/2012 | Morioka et al. | |

OTHER PUBLICATIONS

Advisory Action dated Jun. 27, 2013 in U.S. Appl. No. 13/168,823.
Office Action dated Jun. 27, 2013 in U.S. Appl. No. 13/280,938.
Office Action dated Aug. 1, 2013 in U.S. Appl. No. 13/619,391.
card.io—How it works, 1 page, www.card.io, 2012.
Office Action dated Nov. 22, 2011 in U.S. Appl. No. 13/168,072.
Office Action dated Jan. 5, 2012 in U.S. Appl. No. 13/168,835.
Notice of Allowance dated Feb. 15, 2012 in U.S. Appl. No. 13/168,835.
Office Action dated Nov. 22, 2011 in U.S. Appl. No. 13/168,830.
Notice of Allowance dated Mar. 8, 2012 in U.S. Appl. No. 13/168,830.
Office Action dated Nov. 22, 2011 in U.S. Appl. No. 13/168,837.
Notice of Allowance dated Feb. 13, 2012 in U.S. Appl. No. 13/168,837.
Office Action dated Nov. 29, 2011 in U.S. Appl. No. 13/168,843.
Notice of Allowance dated Feb. 13, 2012 in U.S. Appl. No. 13/168,843.
Perez, Taking on Rival Jumio, Payments Startup Card.io Adds Web Suuport, pp. 1-2, www.techcrunch.com, Mar. 22, 2012.
Office Action dated Jun. 28, 2012 in U.S. Appl. No. 13/168,807.
Office Action dated Jul. 10, 2012 in U.S. Appl. No. 13/168,829.
Office Action dated Aug. 30, 2012 in U.S. Appl. No. 13/168,850.
Office Action dated Oct. 15, 2012 in U.S. Appl. No. 13/619,391.
Final Office Action dated Nov. 30, 2012 in U.S. Appl. No. 13/168,829.
Office Action dated Dec. 5, 2012 in U.S. Appl. No. 13/280,938.
Final Office Action dated Dec. 14, 2012 in U.S. Appl. No. 13/168,807.
Final Office Action dated Dec. 20, 2012 in U.S. Appl. No. 13/168,850.
Perez, Cardio Lets You Pay on Mobile by Holding a Credit Card Up to the Phone, pp. 1-2, www.readwriteweb.com, Jun. 23, 2011.
Office Action dated Jan. 29, 2013 in U.S. Appl. No. 13/168,823.
Advisory Action dated Feb. 11, 2013 in U.S. Appl. No. 13/168,829.
Advisory Action dated Feb. 13, 2013 in U.S. Appl. No. 13/168,807.

(56) References Cited

OTHER PUBLICATIONS

Office Action dated Feb. 14, 2013 in U.S. Appl. No. 13/619,131.
Advisory Action dated Mar. 1, 2013 in U.S. Appl. No. 13/168,850.
Office Action dated Mar. 13, 2013 in U.S. Appl. No. 13/168,829.
Final Office Action dated Mar. 29, 2013 in U.S. Appl. No. 13/280,938.
Final Office Action dated Apr. 1, 2013 in U.S. Appl. No. 13/619,391.
Office Action dated Apr. 26, 2013 in U.S. Appl. No. 13/168,850.
Final Office Action dated Apr. 26, 2013 in U.S. Appl. No. 13/168,823.
Notice of Allowance dated May 10, 2013 in U.S. Appl. No. 13/168,829.
Office Action dated May 10, 2013 in U.S. Appl. No. 13/168,827.
Final Office Action dated Jun. 11, 2013 in U.S. Appl. No. 13/619,131.
Advisory Action dated Jun. 14, 2013 in U.S. Appl. No. 13/619,391.
Advisory Action dated Aug. 22, 2013 in U.S. Appl. No. 13/619,131.
Final Office Action dated Aug. 23, 2013 in U.S. Appl. No. 13/168,827.
Office Action dated Aug. 27, 2013 in U.S. Appl. No. 13/215,115.
Office Action dated Sep. 6, 2013 in U.S. Appl. No. 13/619,131.
Office Action dated Sep. 9, 2013 in U.S. Appl. No. 13/168,807.
Office Action dated Sep. 17, 2013 in U.S. Appl. No. 13/168,850.
Notice of Allowance dated Sep. 23, 2013 in U.S. Appl. No. 13/619,131.
Advisory Action dated Oct. 25, 2013 in U.S. Appl. No. 13/168,827.
Final Office Action dated Dec. 23, 2013 in U.S. Appl. No. 13/215,115.
Final Office Action dated Jan. 16, 2014 in U.S. Appl. No. 13/280,938.
Notice of Allowance dated Jan. 31, 2014 in U.S. Appl. No. 13/280,938.
Advisory Action dated Mar. 3, 2014 in U.S. Appl. No. 13/215,115.
Final Office Action dated Mar. 6, 2014 in U.S. Appl. No. 13/168,850.
Final Office Action dated Mar. 14, 2014 in U.S. Appl. No. 13/619,391.
Restriction Requirement dated Apr. 7, 2014 in U.S. Appl. No. 13/215,145.
Advisory Action dated Apr. 7, 2014 in U.S. Appl. No. 13/168,850.
Advisory Action dated Apr. 8, 2014 in U.S. Appl. No. 13/619,391.

\* cited by examiner

SYSTEM AND METHOD FOR PREVENTING UNAUTHORIZED ACCESS TO FINANCIAL ACCOUNTS

CROSS-REFERENCE TO RELATED APPLICATIONS

The present application is a continuation of U.S. patent application Ser. No. 12/108,064, filed on Apr. 23, 2008, which claims benefit of U.S. Provisional Application No. 61/014,313, filed on Dec. 17, 2007. The entire disclosure of each of these earlier applications is incorporated by reference herein.

BACKGROUND OF THE INVENTION

Field of the Invention

The present invention generally relates to financial transaction systems, and more particularly to methods, systems, apparatuses, and computer program products for preventing unauthorized use of financial accounts.

Related Art

Many financial service providers offer transaction cards to customers, who use the transaction cards as a substitute for cash when making purchases. Customers provide funding account numbers associated with these transaction cards to vendors when making purchases. For example, a customer purchasing an item from a vendor using a credit card provides a corresponding credit card number to the vendor.

If the vendor stores the credit card number in a computer file or database, measures must be taken to protect the customer's credit card number from unauthorized disclosure. Such measures are expensive and time consuming. Moreover, if a vendor is responsible for an unauthorized disclosure of a funding account number, the vendor might be liable for damages resulting from unauthorized access to a corresponding financial account using the funding account number.

There exists, therefore, a need to protect funding account numbers from unauthorized disclosure. In addition, there exists a need to protect financial accounts from unauthorized access due to compromised account numbers.

BRIEF DESCRIPTION OF THE INVENTION

The present invention meets the above-identified needs by providing methods, systems, apparatuses, and computer program products for preventing unauthorized access to funding accounts.

In accordance with an embodiment of the present invention, there is provided a method for preventing unauthorized access to financial accounts. A global external code corresponding to a funding account code is created, where the funding account code is associated with a financial account. The global external code is associated with the funding account code. The global external code and an association between the funding account code and the global external code is stored in a memory. A request for the global external code associated with the funding account code is received. The global external code associated with the funding account code is retrieved from the memory, and the global external code is provided.

In an aspect of the embodiment, the funding account code is configured to be usable directly for payments from the financial account, and the global external code is configured not to be usable directly for payments from the financial account.

In another aspect of the embodiment, an encrypted file that includes the funding account code is received, and the file is decrypted. The file may include other funding account codes. The funding account code may be received via a secure connection over a communications network.

In a further aspect of the embodiment, a file that includes the global external code is provided, and the file is encrypted. The file may include other global external codes. The global external code may be provided via a communications network. For example, a file containing a global external number is generated and encrypted, and the encrypted file is transmitted via a private communications network to a vendor.

In another aspect of the embodiment, a request for a funding account code associated with a global external code method is received. The funding account code associated with the global external code is provided. Billing information is received, where the billing information includes the funding account code and an amount. A financial account associated with the funding account code is charged based on the amount of the billing information. In addition, payment in the amount of the billing information is provided.

In yet another aspect of the embodiment, a request for a funding account code associated with a global external code is received. The funding account code associated with the global external code is provided. Billing information is received, where the billing information includes the funding account code and an amount. The financial account associated with the funding account code is credited based on the amount of the billing information.

In accordance with another embodiment of the present invention, there is provided a method for preventing unauthorized access to financial accounts. A funding account code, a global external code, and account holder information are associated with each of a plurality funding accounts, where the global external codes cannot be used to directly access any funding accounts. The global external codes and respective associations between the funding account codes and the global external codes are stored in a memory. A request for a global external code associated with a funding account code is received from a requester. The global external code associated with the received funding account code is retrieved from the memory. The retrieved global external code is provided to the requester.

In accordance with yet another embodiment of the present invention, there is provided a method for preventing unauthorized access to financial accounts. A plurality of global external codes respectively corresponding to a plurality of funding account codes is generated. The plurality of global external codes is stored in a memory. A request for a global external code associated with a funding account code is received from a requester. The global external code corresponding to the received funding account code is retrieved from the memory. The retrieved global external code is provided to the requester.

In accordance with still another embodiment of the present invention, there is provided a method for preventing unauthorized access to financial accounts. A request for a funding account code associated with a global external code is received. Billing information is received, where the billing information includes a funding account code, identification information, and an amount. Funding account information associated with the funding account number is accessed. A determination is made regarding whether the identification information is included in the funding account information associated with the funding account number. If the identification information is included in the funding account information associated with funding account number, a funding account associated with the funding account number is charged and payment in the amount included in the billing information is provided.

In accordance with another embodiment of the present invention, there is provided a method for preventing unauthorized access to financial accounts. A funding account code is received, where the funding account code is associated with a financial account, and the funding account code is usable directly for payments from the financial account. A global external code associated with the funding account code is requested, where the funding account code is not usable directly for payments from the financial account. The global external code is received and stored in a memory.

In an aspect of the embodiment, the funding account code is stored temporarily in a memory prior to requesting the global external code associated with the funding account code. After receiving the global external code, the funding account code is deleted from the memory.

In another aspect of the embodiment, the funding account code associated with the global external code is requested. Billing information is generated, where the billing information includes the funding account code and an amount. The billing information is provided, and a payment including the amount of the billing information is received.

In yet another aspect of the embodiment, a transaction record is stored in a memory, where the transaction record includes the global external code. The funding account code is received again. The global external code associated with the funding account code is requested again. The global external code is received again. The transaction record is retrieved from the memory using the global external code.

In another aspect of the embodiment, a file that includes the funding account code is provided, and the file is encrypted. The file may include other funding account codes.

In still another aspect of the embodiment, a file that includes the global external code is received, and the file is decrypted. The file may include other global external codes.

In another aspect of the embodiment, identification information is provided that corresponds to a financial account associated with a funding account code. The identification information may include one or a combination of: a telephone code, a birth date, a name, and an address.

In accordance with yet another embodiment of the present invention, there is provided a computer system that includes a processor and a memory storing control logic for causing the processor to prevent unauthorized access to financial accounts. First computer-readable program code causes the processor to create a global external code corresponding to a funding account code, where the funding account code is associated with a financial account. Second computer-readable program code causes the processor to associate the global external code with the funding account code. Third computer-readable program code causes the processor to store the global external code and an association between the funding account code and the global external code in a memory. Fourth computer-readable program code causes the processor to receive a request for the global external code associated with the funding account code. Fifth computer-readable program code causes the processor to retrieve the global external code associated with the funding account code from the memory. Sixth computer-readable program code causes the processor to provide the global external code.

In an aspect of the embodiment, the control logic further includes seventh computer-readable program code that causes the processor to configure the funding account code to be usable directly for payments from the financial account. In addition, eighth computer-readable program code causes the processor to configure the global external code not to be usable directly for payments from the financial account.

In another aspect of the embodiment, the fourth computer-readable program code causes the processor to receive a file that includes the funding account code. The control logic further includes seventh computer-readable program code that causes the processor to decrypt the file. The file may include other funding account codes.

In a further aspect of the embodiment, the sixth computer-readable program code causes the processor to provide a file that includes the global external code. The control logic further includes seventh computer-readable program code that causes the processor to encrypt the file. The file may include other global external codes. For example, the global external code may be provided to a vendor in an encrypted file, which also contains other global external codes corresponding to other financial account codes.

In another aspect of the embodiment, the control logic further includes seventh computer-readable program code that causes the processor to receive a request for the funding account code associated with the global external code. Eighth computer-readable program code causes the processor to provide the funding account code associated with the global external code. Ninth computer-readable program code causes the processor to receive billing information, where the billing information includes the funding account code and an amount. Tenth computer-readable program code causes the processor to charge the financial account associated with the funding account code based on the amount of the billing information. Eleventh computer-readable program code causes the processor to provide payment in the amount of the billing information.

In still another aspect of the embodiment, the control logic further includes seventh computer-readable program code that causes the processor to receive a request for the funding account code associated with the global external code. Eighth computer-readable program code causes the processor to provide the funding account code associated with the global external code. Ninth computer-readable program code causes the processor to receive billing information, where the billing information includes the funding account code and an amount. Tenth computer-readable program code causes the processor to credit the financial account associated with the funding account code based on the amount of the billing information.

In accordance with yet another embodiment of the present invention, there is provided a computer system including a processor and a memory storing control logic for causing the processor to prevent unauthorized access to financial accounts. The control logic includes first computer-readable program code that causes the processor to, for a plurality of funding accounts, associate each funding account with a funding account code, a global external code, and account holder information, where the global external code cannot be used to directly access the funding account. Second computer-readable program code causes the processor to store, in a memory, the global external codes and respective associations between the funding account codes and the global external codes. Third computer-readable program code causes the processor to receive a request for a global external code associated with a funding account code. Fourth computer-readable program code causes the processor to retrieve, from the memory, the global external code associated with the received funding account code. Fifth computer-readable program code causes the processor to provide the global external code corresponding to the received funding account code.

In accordance with still another embodiment of the present invention, there is provided a computer system including a processor and a memory storing control logic for causing the processor to prevent unauthorized access to financial accounts. The control logic includes first computer first computer-readable program code that causes the processor to generate a plurality of global external codes respectively corresponding to a plurality of funding account codes. Second computer-readable program code causes the processor to store the plurality of global external codes in a memory. Third computer-readable program code causes the processor to receive a request for a global external code associated with a funding account code. Fourth computer-readable program code causes the processor to retrieve, from the memory, the global external code corresponding to the received funding account code. Fifth computer-readable program code causes the processor to provide the retrieved global external code.

In accordance with another embodiment of the present invention, there is provided a computer system including a processor and a memory storing control logic for causing the processor to prevent unauthorized access to financial accounts. The control logic includes first computer-readable program code that causes the processor to receive a request for a funding account code associated with a global external code. Second computer-readable program code causes the processor to receive billing information, where the billing information includes a funding account code, identification information, and an amount. Third computer-readable program code causes the processor to access funding account information associated with the funding account number. Fourth computer-readable program code causes the processor to determine whether the identification information is included in the funding account information associated with the funding account number. Fifth computer-readable program code causes the processor to, if the identification information is included in the funding account information associated with funding account number, charge a funding account associated with the funding account number and providing payment in the amount included in the billing information.

In accordance with yet another embodiment of the present invention, there is provided a computer system including a processor and a memory storing control logic for causing the processor to prevent unauthorized access to financial accounts. The control logic includes first computer-readable program code that causes the processor to receive a funding account code, where the funding account code is associated with a financial account, and where the funding account code is usable directly for payments from the financial account. Second computer-readable program code causes the processor to request a global external code associated with the funding account code, where the funding account code is not usable directly for payments from the financial account. Third computer-readable program code causes the processor to receive the global external code. Fourth computer-readable program code causes the processor to store the global external code in a memory.

In an aspect of the embodiment, the control logic further includes fifth computer-readable program code that, prior to requesting the global external code associated with the funding account code, causes the processor to temporarily store the funding account code in the memory. In addition, sixth computer-readable program code causes the processor to delete the funding account code from the memory, after the global external code is received.

In another aspect of the embodiment, the control logic further includes fifth computer-readable program code that causes the processor to request the funding account code associated with the global external code. Sixth computer-readable program code causes the processor to generate billing information, where the billing information includes the funding account code and an amount. Seventh computer-readable program code causes the processor to provide the billing information. Eighth computer-readable program code causes the processor to receive a payment including the amount of the billing information.

In yet another aspect of the embodiment, the control logic further includes fifth computer-readable program code that causes the processor to store a transaction record in the memory, where the transaction record includes the global external code. Sixth computer-readable program code causes the processor to retrieve the transaction record from the memory using the global external code.

In a further aspect of the embodiment, the second computer-readable program code causes the processor to provide a file that includes the funding account code. The control logic further includes fifth computer-readable program code that causes the processor to encrypt the file. The file may include other funding account codes.

In still another aspect of the embodiment, the third computer-readable program code causes the processor to receive a file that includes the global external code. The control logic further includes fifth computer-readable program code that causes the processor to decrypt the file. The file may include other global external codes.

In another aspect of the embodiment, the control logic further includes fifth computer-readable program code that causes the processor to provide identification information corresponding to the financial account associated with the funding account code, where the identification information is one or a combination of: a telephone code, a birth date, a name, and an address.

BRIEF DESCRIPTION OF THE DRAWINGS

The features and advantages of the present invention will become more apparent from the detailed description set forth below when taken in conjunction with the drawings, in which like reference numbers indicate identical or functionally similar elements.

DETAILED DESCRIPTION

I. Overview

The present invention is directed to methods, systems, apparatuses, and computer program products for preventing unauthorized access to financial accounts. The present invention provides a convenient and reliable system and method for safeguarding funding account numbers from unauthorized disclosure, and for preventing unauthorized access to financial accounts.

In an embodiment of the present invention, a financial services system generates a funding account number associated with a financial account and a corresponding global external number, which are stored in a database. The financial services system issues the funding account number to a customer. The customer provides the funding account number to a vendor. A vendor system provides a request to the financial services system for the global external number corresponding to the funding account number. The financial services system retrieves the global external number corresponding to the funding account number from the database, and provides the global external number to the vendor system. The vendor system stores the global external number with customer information and/or transaction records. The vendor system uses the global external number to generate billing information.

The term "vendor" is used herein to refer to an individual, business, or entity, that offers goods or services for sale or is affiliated with an individual, business, or entity, that offers goods or services for sale. For example, a vendor may be a provider of travel services.

The terms "funding account code" and "funding account number" are used interchangeably herein to refer to a numeric or alphanumeric code, or other code, that is associated with a financial account, and that is used to access funds from the financial account.

It is noted that the terms "customer," "consumer," or "user" are used interchangeably herein to refer to an individual, business, entity, etc., that may purchase goods or services from a vendor.

II. System

The present invention is described in terms of an exemplary system in which an embodiment of the present invention is implemented. This is for convenience only and is not intended to limit the scope of the application of the present invention. It will be apparent to one skilled in the relevant art(s) how to implement the present invention in alternative embodiments.

Figure 1:
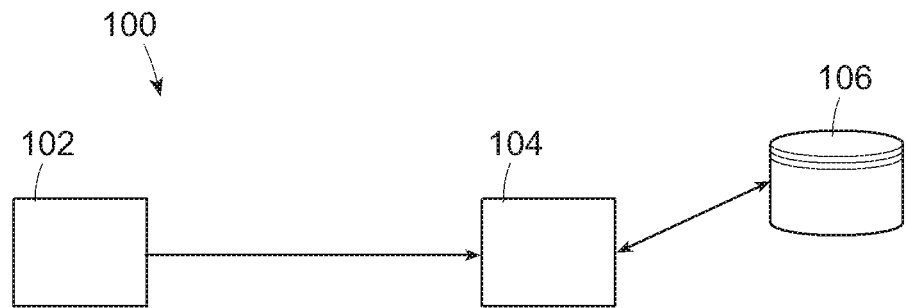
FIG. 1 illustrates a system according to an embodiment of the present invention.

FIG. 1 illustrates a financial services system 100 according to an embodiment of the present invention. The system 100 creates global external numbers and corresponding funding account numbers associated with financial accounts. Optionally, the global external number includes not only numbers, but may include alphanumeric codes or another type of codes.

The financial services system 100 includes a new accounts subsystem 102, which enables new financial accounts to be created. The new accounts subsystem 102 generates funding account numbers, and configures the funding account numbers to enable direct access to associated financial accounts.

For example, the new accounts subsystem 102 selects a funding account number from one or more ranges of valid funding account numbers. The new accounts subsystem 102 determines whether any other financial account is currently associated with the selected funding account number. If the funding account number is not currently associated with another financial account, the funding account number is associated with the funding account, and processed to ensure that it has transactional capabilities.

The funding account number is formatted to ensure that it conforms to a particular numbering or coding scheme used by a financial services provider. For example, many financial services providers use the International Organization for Standardization (ISO) standard 7812. ISO 7812 numbers have a maximum of nineteen digits, and contain a single-digit Major Industry Identifier (MII), a six-digit Issuer Identifier Number (IIN), an Account Number, and a single-digit Checksum.

Once the funding account number is properly formatted and activated for use, the funding account number can be used directly to access funds from an associated financial account.

Once the funding account number has been created, the new accounts subsystem 102 issues a request to a global external number generation subsystem 104. The request includes the funding account number. The global external number generation subsystem 104 selects a global external number from one or more ranges of valid global external numbers. The global external number generation subsystem 104 determines whether any other funding account is currently associated with the selected global external number. If the global external number is not currently associated with another funding account, the global external number is processed to associate it with the funding account number of the request. The global external number is configured such that it has no transactional capabilities.

For example, to ensure that the global external number has no transactional capabilities, the external number generation subsystem 104 could append an invalid checksum to the to global external number. Optionally, the external number generation subsystem 104 may store the global external number in a list of numbers that are not to be used to provide direct access to financial accounts. In another option, the number of digits or characters in the global external number, or the arrangement of the digits or characters, prevents use of the global external number to directly access a financial account. Once the global external number is processed, the global external number generation subsystem 104 provides the global external number and an association to the corresponding funding account number to a database subsystem 106 for storage.

If the global external number is compromised by an unauthorized individual who attempts to use the global external number to access funds from the associated financial account, the financial services system 100 will not provide access to the corresponding funding account number and, thus, the financial services system 100 will not provide access to funds from the associated financial account. The following examples illustrate how global external numbers are used to prevent unauthorized access to financial accounts.

III. Exemplary Implementations

Figure 2:
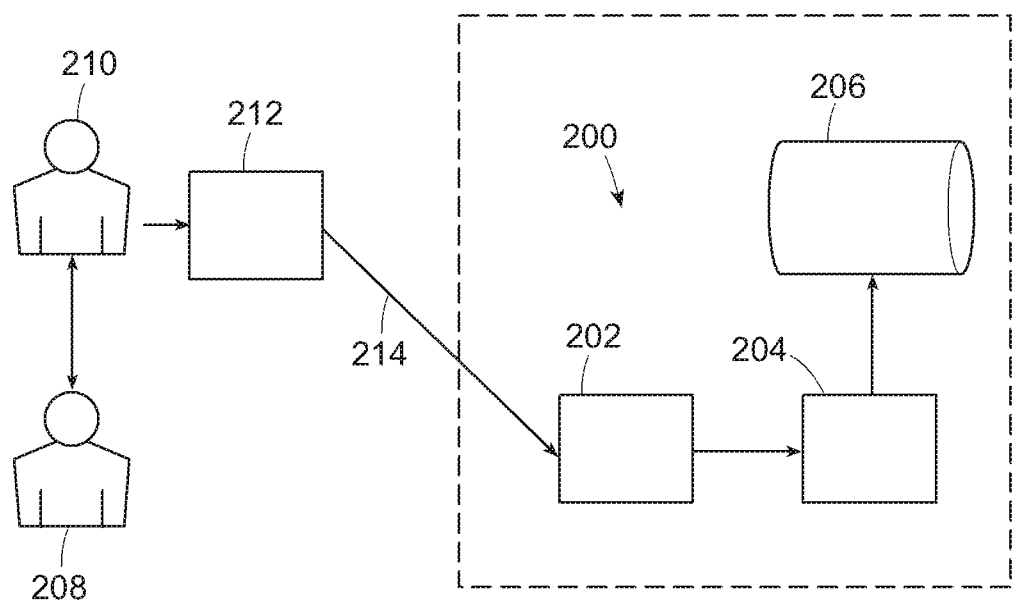
FIG. 2 illustrates an example of using a system according to an embodiment of the present invention.

FIG. 2 shows a financial services system 200 according to an embodiment of the present invention. The financial services system 200 includes a financial services interface subsystem 202, a request processing subsystem 204, and a database subsystem 206. In the following example, a valid funding account number has been created, and provided to a customer 208. In addition, a global external number has been generated, associated with the funding account number, and stored in the database subsystem 206, as described above with reference to FIG. 1.

The customer 208 contacts a vendor's customer service representative 210, and indicates that he would like to transact business. For example, the customer 208 indicates that he would like to purchase a particular item. The customer 208 provides the funding account number to the customer service representative 210. The customer 210 could place a telephone call to the customer service representative 210 and provide the funding account number to the customer service representative 210, who enters the funding account number into a vendor system 212. Alternatively, the customer 210 could provide the funding account number directly to the vendor system 212, for example, by entering the funding account number into a field of a web page form provided by the vendor system 212.

A communications network 214 interconnects the vendor system 212 and the financial services interface subsystem 202. The vendor system 212 provides the funding account number to the financial services interface subsystem 202.

For example, the financial services interface subsystem 202 includes a web server (not illustrated), such as a WebSphere® web server from International Business Machines Corporation. The vendor system 212 includes a web browser (not illustrated), such as an Internet Explorer® web browser from Microsoft Corporation. The web browser of the vendor system 212 and the web server of the financial services interface subsystem 202 communicate using secure hypertext transfer protocol (HTTPS). A secure connection is established between the vendor system 212 and the financial services interface subsystem 202 via HTTPS prior to sending the funding account number. Accordingly, the funding account number is protected from unauthorized disclosure during transit through the communications network 214.

The financial services interface subsystem 202 receives the funding account number from the vendor system 212. The financial services interface subsystem 202 also records a vendor identifier associated with the vendor system 212, such as an Internet Protocol (IP) address used by the vendor system 212, for example. The financial services interface subsystem 202 provides the funding account number and the vendor identifier to the request processing system 204. The request processing system 204 queries the database subsystem 206 for the global external number associated with the funding account number. Once the associated global external number is received from the database subsystem 206, the request processing subsystem 204 provides the global external number to the financial services interface subsystem 202, which provides the global external number to vendor system 212.

The vendor system 212 stores the global external number in a memory (not illustrated) along with customer identification information, such as a telephone number, a birth date, a name, and/or an address associated with the customer 208. The funding account number is not stored by the vendor system 212. Accordingly, if data stored by the vendor system 212 is compromised, the funding account number is not disclosed to an unauthorized individual.

The vendor system 212 sends a transaction settlement request to the financial services interface subsystem 202 to receive payment for an item being purchased by the customer 208. The transaction settlement request includes a vendor identifier, a description of the item, an amount, a funding account number, an approval code, and customer identification information. The vendor system 212 retrieves a transaction record associated with the purchase of the item, and obtains information required to submit the transaction settlement request. The vendor system 212 uses the global external number in the transaction record to request the corresponding funding account number from the financial services system 200. Once the corresponding funding account number is returned by the financial services system 200, the vendor system 212 provides the transaction settlement request to the financial services system 200 to obtain payment for the item.

It is noted that the financial services interface subsystem 202 authenticates the vendor system 212, prior to responding to the request for the funding account number corresponding to the global external number. For example, the financial services interface subsystem 202 checks a list of authorized IP addresses for an IP address of the vendor system 212. If the vendor system 212 is authorized to make such requests, the funding account number corresponding to the global external number is returned to the vendor system 212. Accordingly, unauthorized vendors will not receive funding account numbers and, therefore, will not be able to access funds from associated financial accounts.

Alternatively, the vendor system 212 may be authorized to submit transaction settlement requests to the financial services system 200 by providing the global external number and another item of information pertaining to the corresponding financial account, without requiring the submission of the corresponding financial account number.

Figure 3:
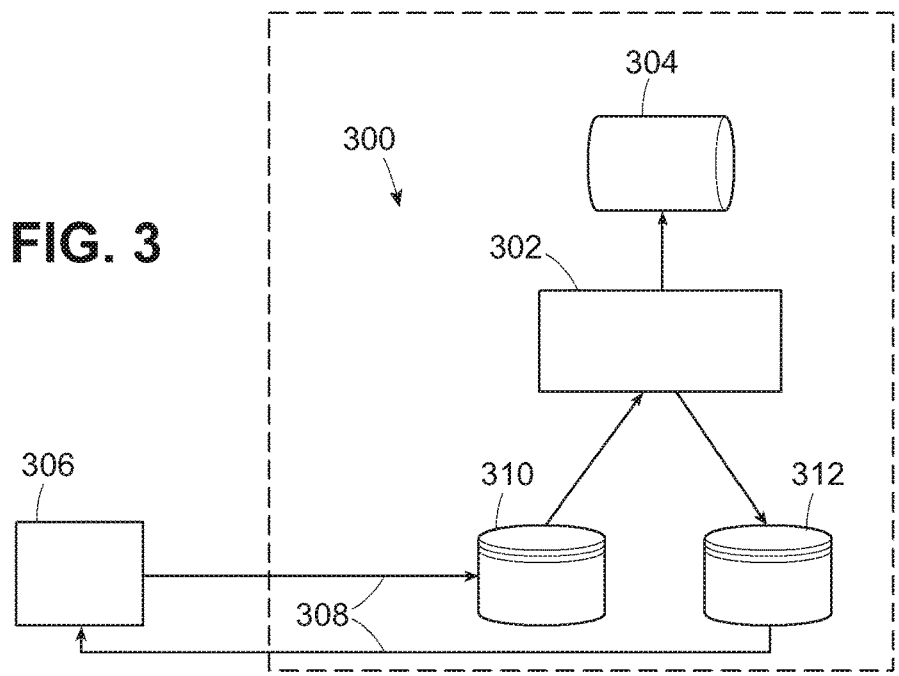
FIG. 3 illustrates another example of using a system according to an embodiment of the present invention.

FIG. 3 shows a financial services system 300 according to an embodiment of the present invention. The system 300 includes a request processing subsystem 302, and a database subsystem 304. In the following example, valid funding account numbers have been created, and provided to a vendor system 306. In addition, global external numbers have been generated, associated with corresponding funding account numbers, and stored in the database subsystem 304, as described above with reference to FIG. 1.

A communications network 308 interconnects the vendor system 306 and the request processing subsystem 302. Initially, the vendor system 306 stores a file 310 in a memory (not illustrated). The file 310 includes funding account numbers. The vendor system 306 provides the file 310 to the request processing subsystem 302 via the communication network 308. The vendor system 306 and the request processing subsystem 302 communicate securely. The file 310 is encrypted by the vendor system 306 prior to transmission, and decrypted by the request processing system 302 upon receipt. For example, the vendor system 306 and the request processing subsystem 302 implement a SecureTransport system from Tumbleweed Communications Corporation to protect the contents of the file 310 from unauthorized disclosure during transit through the communications network 308.

The request processing subsystem 302 authenticates the vendor system 306, queries the database subsystem 304 using the funding account numbers included in the file 310, and creates a file 312 that includes corresponding global external numbers. The file 312 is encrypted by the request processing subsystem 302 prior to transmission, and decrypted by the vendor system 306 upon receipt. The vendor system 306 replaces the file 310 with the file 312 in the memory. That is, the vendor system 306 deletes the funding account numbers included in the file 310, and stores in their place corresponding global external numbers included in the file 312.

After this process has completed, the vendor system 306 no longer stores any funding account numbers. Accordingly, if the vendor system 306 is compromised, the financial accounts associated with the compromised global external numbers will not be in danger of unauthorized use.

In addition, the vendor system 306 can periodically send transaction settlement requests to the request processing subsystem 302 using one of the stored global external numbers, without receiving a corresponding funding account number again from a customer. For example, if the vendor system 306 sends monthly transaction settlement requests to the request processing subsystem 302, to receive payments for a monthly service, the vendor system 306 does not have to receive the corresponding funding account number from the customer each month. Instead, the vendor system 306 requests a funding account number, corresponding to one of the stored global external numbers from the financial services system 300, and uses a returned funding account number to generate the transaction settlement request, as described above with reference to FIG. 2.

Figure 4:
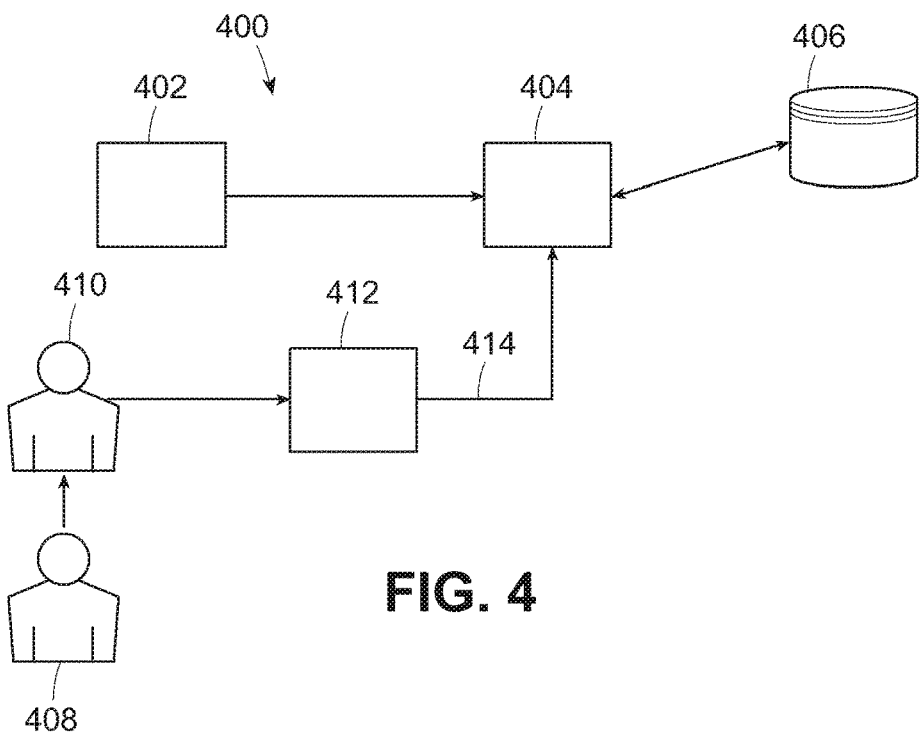
FIG. 4 illustrates yet another example of using a system according to an embodiment of the present invention.

FIG. 4 shows a financial services system 400 according to an embodiment of the present invention. The financial services system 400 includes a financial services interface subsystem 402, a request processing subsystem 404, and a database subsystem 406. In the following example, a valid funding account number has been created, and provided to a customer 408. A corresponding global external number has been generated, associated with the funding account number, and stored in the database subsystem 406, as described above with reference to FIG. 1.

The customer 408 provides the funding account number to a customer service representative 410 while purchasing an item. The customer service representative 410 uses a vendor system 412 to process the transaction. The vendor system 412 requests the global external number associated with the funding account number from the request processing subsystem 404, which returns the corresponding global external number. The vendor system 412 then creates a transaction record that includes a vendor identifier, a description of the item, an amount, the global external number, an approval code, and customer identification information. The transaction record is stored in the vendor system 412.

Subsequently, the customer 408 contacts the customer service representative 410, and inquires about the purchased item. The customer 408 provides her funding account number to the customer service representative 410. The customer service representative 410 uses the vendor system 412 to request the corresponding global external number from the request processing subsystem 404. The request processing subsystem 404 returns the corresponding global external number to the vendor system 412.

The vendor system 412 then retrieves the transaction record using the global external number returned by the request processing subsystem 404, and provides details of the transaction record to the customer 408. Accordingly, the vendor system 412 does not need to store funding account number in transaction records. Instead, a customer supplied funding account number may be used to request a corresponding global external number, which are used to retrieve stored transaction records.

The present invention (i.e., financial services systems 100, 200, 300, and 400; vendor systems 212, 306, and 412; or any part(s) or function(s) thereof) may be implemented using hardware, software, or a combination thereof, and may be implemented in one or more computer systems or other processing systems. Useful machines for performing some or all of the operations of the present invention include general-purpose digital computers or similar devices.

Figure 5:
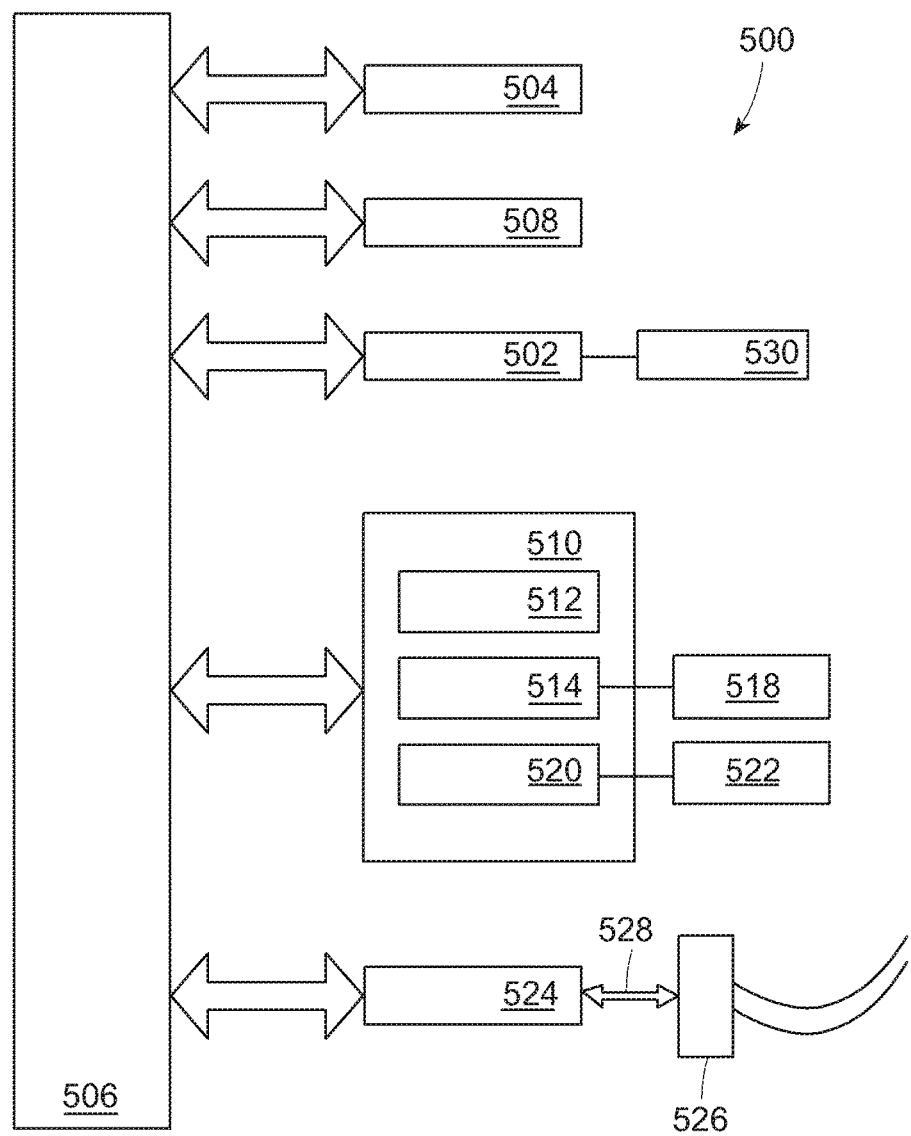
FIG. 5 illustrates a block diagram of an exemplary computer system useful for implementing an aspect of the present invention.

In fact, in one embodiment, the present invention is directed toward one or more computer systems equipped to carry out the functions described herein. An example of such a computer system 500 is shown in FIG. 5.

Computer system 500 includes at least one processor 504. Processor 504 is connected to a communication infrastructure 506 (e.g., a communications bus, a cross-over bar device, or a network). Although various software embodiments are described herein in terms of this exemplary computer system 500, after reading this description, it will become apparent to a person skilled in the relevant art(s) how to implement the invention using other computer systems and/or architectures.

Computer system 500 includes a display interface 502 that forwards graphics, text, and other data from communication infrastructure 506 (or from a frame buffer (not shown)) for display on a display unit 530.

Computer system 500 also includes a main memory 508, which preferably is a random access memory (RAM), and may also include a secondary memory 510.

Secondary memory 510 may include, for example, a hard disk drive 512 and/or a removable-storage drive 514 (e.g., a floppy disk drive, a magnetic tape drive, an optical disk drive, and the like). Removable-storage drive 514 reads from and/or writes to a removable storage unit 518 in a well-known manner. Removable storage unit 518 may be, for example, a floppy disk, a magnetic tape, an optical disk, and the like, which is written to and read by removable-storage drive 514. As will be appreciated, removable storage unit 518 includes a computer-usable storage medium having stored therein computer software and/or data.

In alternative embodiments, secondary memory 510 may include other similar devices for allowing computer programs or other instructions to be loaded into computer system 500. Such devices may include a removable storage unit 522 and an interface 520 (e.g., a program cartridge and a cartridge interface similar to those used with video game systems); a removable memory chip (e.g., an erasable programmable read-only memory ("EPROM") or a programmable read-only memory ("PROM")) and an associated memory socket; and other removable storage units 522 and interfaces 520 that allow software and data to be transferred from removable storage unit 522 to computer system 500.

Computer system 500 may also include a communications interface 524, which allows software and data to be transferred between computer system 500 and external devices (not shown). Examples of communications interface 524 may include a modem, a network interface (e.g., an Ethernet card), a communications port, a Personal Computer Memory Card International Association ("PCMCIA") interface, and the like. Software and data transferred via communications interface 524 are in the form of signals 528, which may be electronic, electromagnetic, optical or another type of signal that is capable of being received by communications interface 524. Signals 528 are provided to communications interface 524 via a communications path 526 (e.g., a channel). Communications path 526 carries signals 528 and may be implemented using wire or cable, fiber optics, a telephone line, a cellular link, a radio-frequency ("RF") link, or the like.

As used herein, the phrases "computer program medium" and "computer usable medium" may be used to generally refer to removable storage unit 518 used with removable-storage drive 514, a hard disk installed in hard disk drive 512, and signals 528, for example. These computer program products provide software to computer system 500. The present invention may be implemented or embodied as one or more of such computer program products.

Computer programs (also referred to as computer control logic) are stored in main memory 508 and/or secondary memory 510. The computer programs may also be received via communications interface 524. Such computer programs, when executed, enable computer system 500 to perform the features of the present invention, as discussed herein. In particular, the computer programs, when executed, enable the processor 504 to perform the features of the present invention. Accordingly, such computer programs represent controllers of computer system 500.

In an embodiment where the present invention is implemented using software, the software may be stored in a computer program product and loaded into computer system 500 using removable-storage drive 514, hard drive 512, or communications interface 524. The control logic (software), when executed by processor 504, causes processor 504 to perform the functions of the present invention as described herein.

In another embodiment, the present invention is implemented primarily in hardware using, for example, hardware components such as application-specific integrated circuits ("ASICs"). Implementation of such a hardware arrangement so as to perform the functions described herein will be apparent to persons skilled in the relevant art(s).

In yet another embodiment, the present invention is implemented using a combination of both hardware and software.

As will be appreciated by those of skill in the relevant art(s), the present invention may be implemented using a single computer or using a computer system that includes multiple computers each programmed with control logic to perform various of the above-described functions of the present invention.

IV. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

What is claimed is:

1. A payment processor system comprising:
    a processor; and
    a tangible, non-transitory memory configured to communicate with the processor, the tangible, non-transitory memory having instructions stored thereon that, in response to execution by the processor, cause the processor to perform operations comprising:
    receiving, by the payment processor system and from the vendor system, a funding account code and a request for a global external code,
        wherein the funding account code corresponds to the global external code and a vendor identifier,
        wherein the vendor system received the funding account code from a customer,
        wherein the vendor system does not retain the funding account code;
    determining, by the payment processor system, the global external code based on the funding account code;
    transmitting, by the payment processor system and to the vendor system, the global external code in response to the request;
    receiving, by the payment processor system and from the vendor system, a transaction settlement request including transaction information and the global external code;
    determining, by the payment processor system, an IP address of the vendor system based on the vendor identifier;
    determining, by the payment processor system, that the IP address is on a list of authorized IP addresses;
    authorizing, by the payment processor system, the transaction settlement request based on the IP address being on the list of authorized IP addresses and based on the global external code.

2. The system according to claim 1, wherein the payment processor system performs additional operations comprising:
    establishing the funding account code as an authorized code that accesses funds from the financial account, and
    establishing the global external code that is restricted from accessing the funds from the financial account.

3. The system according to claim 1, wherein the payment processor system performs additional operations comprising receiving an encrypted file that includes the funding account code, and decrypting, by the processor, the encrypted file.

4. The system according to claim 1, further comprising:
    receiving, by the payment processor system and from the vendor system, a request for the funding account code to include with the transaction settlement request; and
    transmitting, by the payment processor system and to the vendor system, the funding account code.

5. The system according to claim 1, wherein the payment processor system performs settlement operations comprising:
    receiving the global external code as part of the transaction settlement request to obtain the funding account code associated with the global external code;
    transmitting the funding account code associated with the global external code;
    receiving, as part of the transaction settlement request, the transaction information that includes the funding account code and an amount; and
    charging the financial account associated with the funding account code based on the amount.

6. The system according to claim 1, wherein the payment processor system performs settlement operations comprising:
receiving the global external code as part of the transaction settlement request to obtain the funding account code associated with the global external code;
transmitting, by the processor, the funding account code associated with the global external code;
receiving the transaction information that includes the funding account code and an amount; and
crediting, as part of the transaction settlement request, the financial account associated with the funding account code based on the amount of the transaction information.

7. The system according to claim 1, wherein the payment processor system performs additional operations comprising:
receiving a request for the funding account code associated with the global external code;
receiving the transaction information that includes the funding account code, identification information, and an amount;
accessing funding account information associated with the funding account code;
determining whether the identification information is included in the funding account information associated with the funding account code;
charging a funding account associated with the funding account code; and
providing, by the processor, payment in the amount included in the transaction information if the identification information is included in the funding account information associated with the funding account code.

8. The system of claim 1, further comprising:
associating, by the payment processor system, the global external code with the funding account code that corresponds to the financial account; and
storing, by the payment processor system, the global external code in association with the funding account code,
wherein the funding account code accesses funds from the financial account;
wherein the global external code is restricted from accessing funds from the financial account.

9. The system of claim 1, wherein the vendor system stores the global external code, without storing the funding account code.

10. The system of claim 1, further comprising rejecting, by the payment processor system, an authorization of the funding account code, in response to the global external code being unauthorized.

11. The system of claim 1, wherein the global external code is prevented from accessing the financial account due to the global external code having an invalid checksum appended to the global external code.

12. The system of claim 1, wherein the global external code is prevented from accessing the financial account due to the global external code being restricted from being used based on the global external code being matched to a list of restricted numbers.

13. The system of claim 1, wherein the global external code is prevented from accessing the financial account due to a number of digits in the global external code being recognized by the processor as incompatible with a transaction standard.

14. The system of claim 1, wherein the global external code is prevented from accessing the financial account due to an arrangement of digits in the global external code being recognized by the processor as incompatible with a transaction standard.

15. A method comprising:
receiving, by a payment processor system and from the vendor system, a funding account code and a request for a global external code,
wherein the funding account code corresponds to the global external code and a vendor identifier,
wherein the vendor system received the funding account code from a customer,
wherein the vendor system does not retain the funding account code;
determining, by the payment processor system, the global external code based on the funding account code;
transmitting, by the payment processor system and to the vendor system, the global external code in response to the request;
receiving, by the payment processor system and from the vendor system, a transaction settlement request including transaction information and the global external code;
determining, by the payment processor system, an IP address of the vendor system based on the vendor identifier;
determining, by the payment processor system, that the IP address is on a list of authorized IP addresses;
authorizing, by the payment processor system, the transaction settlement request based on the IP address being on the list of authorized IP addresses and based on the global external code.

16. The method according to claim 15, further comprising:
establishing, by the payment processor system, the funding account code as an authorized code that accesses funds from the financial account;
establishing, by the payment processor system, the global external code that is restricted from accessing the funds from the financial account via at least one of a checksum;
storing, by payment processor system, the global external code in a list of numbers that are unauthorized for accessing the financial account or having at least one of a number of digits, a number of characters, an arrangement of the digits or an arrangement of the characters that prevents use of the global external code from accessing the financial account.

17. An article of manufacture including a non-transitory, tangible computer readable storage medium having instructions stored thereon that, in response to execution by a payment processor system, cause the payment processor system to perform operations comprising:
receiving, by the payment processor system and from the vendor system, a funding account code and a request for a global external code,
wherein the funding account code corresponds to the global external code and a vendor identifier,
wherein the vendor system received the funding account code from a customer,
wherein the vendor system does not retain the funding account code;
determining, by the payment processor system, the global external code based on the funding account code;
transmitting, by the payment processor system and to the vendor system, the global external code in response to the request;

receiving, by the payment processor system and from the vendor system, a transaction settlement request including transaction information and the global external code;

determining, by the payment processor system, an IP address of the vendor system based on the vendor identifier;

determining, by the payment processor system, that the IP address is on a list of authorized IP addresses;

authorizing, by the payment processor system, the transaction settlement request based on the IP address being on the list of authorized IP addresses and based on the global external code.

18. The article according to claim 17, further comprising:

receiving, by the payment processor system, the request from a vendor; and transmitting, by the payment processor system, the global external code to the vendor.

19. The article according to claim 17, further comprising:

receiving, by the payment processor system, the global external code as part of the transaction settlement request to obtain the funding account code associated with the global external code;

transmitting, by the payment processor system, the funding account code associated with the global external code;

receiving, by the payment processor system and as part of the transaction settlement request, the transaction information that includes the funding account code and an amount; and charging, by the payment processor system, the financial account associated with the funding account code based on the amount.

20. The article according to claim 17, further comprising:

receiving, by the payment processor system, the global external code as part of the transaction settlement request to obtain the funding account code associated with the global external code;

transmitting, by the payment processor system, the funding account code associated with the global external code;

receiving, by the payment processor system and as part of the transaction settlement request, the transaction information that includes the funding account code and an amount; and crediting, by the payment processor system, the financial account associated with the funding account code based on the amount of the transaction information.

21. The article according to claim 17, further comprising:

receiving, by the payment processor system, a request for the funding account code associated with the global external code;

receiving, by the payment processor system, the transaction information that includes a funding account code, identification information, and an amount;

accessing, by the payment processor system, funding account information associated with the funding account code;

determining, by the payment processor system, whether the identification information is included in the funding account information associated with the funding account code;

charging, by the payment processor system, a funding account associated with the funding account code; and providing, by the payment processor system, payment in the amount included in the transaction information in response to the identification information being included in the funding account information associated with funding account code.

* * * * *